US009641456B2

(12) United States Patent
Ohana et al.

(10) Patent No.: US 9,641,456 B2
(45) Date of Patent: *May 2, 2017

(54) APPARATUS AND METHODS FOR REDUCTION OF TRANSMISSION DELAY IN A COMMUNICATION NETWORK

(71) Applicant: Broadcom Corporation, Irvine, CA (US)

(72) Inventors: Yitshak Ohana, Jerusalem (IL); Philippe Klein, Jerusalem (IL); Avi Kliger, Ramat Gan (IL); Stephen Palm, Irvine, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 302 days.

This patent is subject to a terminal disclaimer.

(21) Appl. No.: 13/632,023

(22) Filed: Sep. 30, 2012

(65) Prior Publication Data

US 2013/0039186 A1 Feb. 14, 2013

Related U.S. Application Data

(63) Continuation of application No. 12/041,368, filed on Mar. 3, 2008, now Pat. No. 8,345,553.

(Continued)

(51) Int. Cl.
*H04L 12/26* (2006.01)
*H04L 12/931* (2013.01)
*H04L 12/28* (2006.01)

(52) U.S. Cl.
CPC ........ *H04L 49/206* (2013.01); *H04L 12/2801* (2013.01); *H04L 49/351* (2013.01)

(58) Field of Classification Search
USPC .................................. 370/310–463
See application file for complete search history.

(56) References Cited

U.S. PATENT DOCUMENTS 3,836,888 A    9/1974  Boenke et al.
4,413,229 A   11/1983  Grant
(Continued)

FOREIGN PATENT DOCUMENTS

CN    1422043 A    6/2003
CN    1588827 A    3/2005
(Continued)

OTHER PUBLICATIONS

U.S. Appl. No. 60/901,563, Hyslop, "L2 Messaging Protocol to Enable Parameterized QoS Operations within MoCA Network".*
(Continued)

*Primary Examiner* — Kwang B Yao
*Assistant Examiner* — Juvena Loo
(74) *Attorney, Agent, or Firm* — McDermott Will & Emery LLP

(57) ABSTRACT

Apparatus and methods for reducing latency in coordinated networks are provided. The apparatus and methods relate to a protocol that may be referred to as the Persistent Reservation Request ("p-RR"), which may be viewed as a type of RR (reservation request). p-RR's may reduce latency, on average, to one MAP cycle or less. A p-RR may be used to facilitate Ethernet audiovisual bridging. Apparatus and methods of the invention may be used in connection with coaxial cable based networks that serve as a backbone for a managed network, which may interface with a package switched network.

27 Claims, 10 Drawing Sheets

Related U.S. Application Data

(60) Provisional application No. 60/941,020, filed on May 31, 2007.

(56) References Cited

U.S. PATENT DOCUMENTS

| | | | |
|---|---|---|---|
| 4,536,875 A | 8/1985 | Kume et al. | |
| 4,608,685 A | 8/1986 | Jain et al. | |
| 4,893,326 A | 1/1990 | Duran et al. | |
| 5,052,029 A | 9/1991 | James et al. | |
| 5,170,415 A | 12/1992 | Yoshida et al. | |
| 5,343,240 A | 8/1994 | Yu | |
| 5,421,030 A | 5/1995 | Baran | |
| 5,440,335 A | 8/1995 | Beveridge | |
| 5,570,355 A | 10/1996 | Dail et al. | |
| 5,572,517 A * | 11/1996 | Safadi | H04J 3/1694 |
| | | | 348/E5.006 |
| 5,638,374 A | 6/1997 | Heath | |
| 5,648,958 A * | 7/1997 | Counterman | 370/458 |
| 5,671,220 A | 9/1997 | Tonomura | |
| 5,796,739 A | 8/1998 | Kim et al. | |
| 5,802,173 A | 9/1998 | Hamilton-Piercy et al. | |
| 5,805,591 A | 9/1998 | Naboulsi et al. | |
| 5,805,806 A | 9/1998 | McArthur | |
| 5,815,662 A | 9/1998 | Ong | |
| 5,822,677 A | 10/1998 | Peyrovian | |
| 5,822,678 A | 10/1998 | Evanyk | |
| 5,845,190 A | 12/1998 | Bushue et al. | |
| 5,850,400 A | 12/1998 | Eames et al. | |
| 5,854,887 A | 12/1998 | Kindell et al. | |
| 5,856,975 A | 1/1999 | Rostoker et al. | |
| 5,877,821 A | 3/1999 | Newlin et al. | |
| 5,886,732 A | 3/1999 | Humpleman | |
| 5,896,556 A | 4/1999 | Moreland et al. | |
| 5,917,624 A | 6/1999 | Wagner | |
| 5,930,493 A | 7/1999 | Ottesen et al. | |
| 5,963,844 A | 10/1999 | Dail | |
| 5,982,784 A | 11/1999 | Bell | |
| 6,009,465 A | 12/1999 | Decker et al. | |
| 6,028,860 A | 2/2000 | Laubach et al. | |
| 6,055,242 A | 4/2000 | Doshi et al. | |
| 6,069,588 A | 5/2000 | O'Neill, Jr. | |
| 6,081,519 A | 6/2000 | Petler | |
| 6,081,533 A | 6/2000 | Laubach et al. | |
| 6,111,911 A | 8/2000 | Sanderford, Jr. et al. | |
| 6,118,762 A | 9/2000 | Nomura et al. | |
| 6,157,645 A | 12/2000 | Shobatake | |
| 6,167,120 A | 12/2000 | Kikinis | |
| 6,192,070 B1 | 2/2001 | Poon et al. | |
| 6,219,409 B1 | 4/2001 | Smith et al. | |
| 6,229,818 B1 | 5/2001 | Bell | |
| 6,243,413 B1 | 6/2001 | Beukema | |
| 6,304,552 B1 | 10/2001 | Chapman et al. | |
| 6,307,862 B1 | 10/2001 | Silverman | |
| 6,418,148 B1 * | 7/2002 | Kumar | H04W 72/0413 |
| | | | 370/330 |
| 6,434,117 B1 * | 8/2002 | Momona | H04L 12/40058 |
| | | | 370/236 |
| 6,434,151 B1 | 8/2002 | Caves et al. | |
| 6,466,651 B1 | 10/2002 | Dailey | |
| 6,480,506 B1 * | 11/2002 | Gubbi | H04W 72/0453 |
| | | | 370/280 |
| 6,481,013 B1 | 11/2002 | Dinwiddie et al. | |
| 6,526,070 B1 | 2/2003 | Bernath et al. | |
| 6,553,568 B1 | 4/2003 | Fijolek et al. | |
| 6,563,829 B1 | 5/2003 | Lyles et al. | |
| 6,567,654 B1 | 5/2003 | Coronel Arredondo et al. | |
| 6,611,537 B1 | 8/2003 | Edens et al. | |
| 6,622,304 B1 | 9/2003 | Carhart | |
| 6,637,030 B1 | 10/2003 | Klein | |
| 6,650,624 B1 | 11/2003 | Quigley et al. | |
| 6,745,392 B1 | 6/2004 | Basawapatna et al. | |
| 6,763,032 B1 | 7/2004 | Rabenko et al. | |
| 6,785,296 B1 | 8/2004 | Bell | |
| 6,816,500 B1 | 11/2004 | Mannette et al. | |
| 6,831,899 B1 | 12/2004 | Roy | |
| 6,836,515 B1 | 12/2004 | Kay et al. | |
| 6,859,899 B2 | 2/2005 | Shalvi et al. | |
| 6,862,270 B1 | 3/2005 | Ho | |
| 6,868,072 B1 * | 3/2005 | Lin | H04L 12/2803 |
| | | | 370/276 |
| 6,877,043 B2 | 4/2005 | Mallory et al. | |
| 6,877,166 B1 | 4/2005 | Roeck et al. | |
| 6,898,210 B1 | 5/2005 | Cheng et al. | |
| 6,930,989 B1 | 8/2005 | Jones, IV et al. | |
| 6,934,752 B1 * | 8/2005 | Gubbi | H04L 69/324 |
| | | | 370/392 |
| 6,940,833 B2 | 9/2005 | Jonas et al. | |
| 6,950,399 B1 | 9/2005 | Bushmitch et al. | |
| 6,961,314 B1 | 11/2005 | Quigley et al. | |
| 6,985,437 B1 | 1/2006 | Vogel | |
| 6,996,198 B2 | 2/2006 | Cvetkovic | |
| 7,035,270 B2 | 4/2006 | Moore, Jr. et al. | |
| 7,065,779 B1 | 6/2006 | Crocker et al. | |
| 7,089,580 B1 | 8/2006 | Vogel et al. | |
| 7,116,685 B2 | 10/2006 | Brown et al. | |
| 7,127,734 B1 | 10/2006 | Amit | |
| 7,133,697 B2 | 11/2006 | Judd et al. | |
| 7,142,553 B1 | 11/2006 | Ojard et al. | |
| 7,146,632 B2 | 12/2006 | Miller | |
| 7,149,220 B2 | 12/2006 | Beukema et al. | |
| 7,194,041 B2 | 3/2007 | Kadous | |
| 7,272,651 B1 * | 9/2007 | Bolding | H04L 12/5695 |
| | | | 709/227 |
| 7,292,527 B2 | 11/2007 | Zhou et al. | |
| 7,296,083 B2 | 11/2007 | Barham et al. | |
| 7,327,754 B2 | 2/2008 | Mills et al. | |
| 7,372,853 B2 | 5/2008 | Sharma et al. | |
| 7,460,543 B2 | 12/2008 | Malik et al. | |
| 7,487,532 B2 | 2/2009 | Robertson et al. | |
| 7,532,642 B1 | 5/2009 | Peacock | |
| 7,532,693 B1 | 5/2009 | Narasimhan | |
| 7,555,064 B2 | 6/2009 | Beadle | |
| 7,574,615 B2 | 8/2009 | Weng et al. | |
| 7,606,256 B2 | 10/2009 | Vitebsky et al. | |
| 7,652,527 B2 | 1/2010 | Ido et al. | |
| 7,653,164 B2 | 1/2010 | Lin et al. | |
| 7,664,065 B2 | 2/2010 | Lu | |
| 7,675,970 B2 | 3/2010 | Nemiroff et al. | |
| 7,697,522 B2 | 4/2010 | Kliger et al. | |
| 7,742,495 B2 | 6/2010 | Kliger et al. | |
| 7,782,850 B2 | 8/2010 | Kliger et al. | |
| 7,783,259 B2 | 8/2010 | Dessert et al. | |
| 7,817,642 B2 | 10/2010 | Ma et al. | |
| 7,835,365 B2 * | 11/2010 | Ayyagari | 370/395.3 |
| 7,860,092 B2 | 12/2010 | Yoon et al. | |
| 7,916,756 B2 | 3/2011 | Atsumi et al. | |
| 8,090,043 B2 | 1/2012 | Levi et al. | |
| 8,098,770 B2 | 1/2012 | Shusterman | |
| 8,146,125 B2 | 3/2012 | Grinkemeyer et al. | |
| 8,184,550 B2 | 5/2012 | Beck et al. | |
| 8,498,294 B1 * | 7/2013 | Monk | H04L 12/2801 |
| | | | 370/392 |
| 2001/0039660 A1 | 11/2001 | Vasilevsky et al. | |
| 2002/0010562 A1 | 1/2002 | Schleiss et al. | |
| 2002/0021465 A1 | 2/2002 | Moore et al. | |
| 2002/0059623 A1 | 5/2002 | Rodriguez et al. | |
| 2002/0059634 A1 | 5/2002 | Terry et al. | |
| 2002/0069417 A1 | 6/2002 | Kliger et al. | |
| 2002/0078247 A1 | 6/2002 | Lu et al. | |
| 2002/0078249 A1 | 6/2002 | Lu et al. | |
| 2002/0097821 A1 | 7/2002 | Hebron et al. | |
| 2002/0105970 A1 | 8/2002 | Shvodian | |
| 2002/0136231 A1 | 9/2002 | Leatherbury et al. | |
| 2002/0141347 A1 | 10/2002 | Harp et al. | |
| 2002/0150155 A1 | 10/2002 | Florentin et al. | |
| 2002/0166124 A1 | 11/2002 | Gurantz et al. | |
| 2002/0174423 A1 | 11/2002 | Fifield et al. | |
| 2002/0194605 A1 | 12/2002 | Cohen et al. | |
| 2003/0013453 A1 | 1/2003 | Lavaud et al. | |
| 2003/0016751 A1 | 1/2003 | Vetro et al. | |
| 2003/0022683 A1 | 1/2003 | Beckmann et al. | |
| 2003/0060207 A1 * | 3/2003 | Sugaya | H04W 72/0406 |
| | | | 455/450 |

(56) References Cited

U.S. PATENT DOCUMENTS

| | | |
|---|---|---|
| 2003/0063563 A1 | 4/2003 | Kowalski |
| 2003/0066082 A1 | 4/2003 | Kliger et al. |
| 2003/0078063 A1* | 4/2003 | Legallais .......... H04L 12/40058 455/509 |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2003/0198246 A1* | 10/2003 | Lifshitz et al. ............... 370/445 |
| 2003/0214928 A1* | 11/2003 | Chuah ......................... 370/336 |
| 2004/0004934 A1 | 1/2004 | Zhu et al. |
| 2004/0022247 A1* | 2/2004 | Chen .................. H04L 12/4608 370/395.5 |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger et al. |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0036466 A1 | 2/2005 | Malik et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0059400 A1 | 3/2006 | Clark et al. |
| 2006/0062250 A1 | 3/2006 | Payne |
| 2006/0078001 A1 | 4/2006 | Chandra et al. |
| 2006/0104201 A1 | 5/2006 | Sundberg et al. |
| 2006/0153214 A1* | 7/2006 | Moore, Jr. .......... H04L 12/2803 370/401 |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0040947 A1 | 2/2007 | Koga |
| 2007/0127373 A1 | 6/2007 | Ho et al. |
| 2007/0160213 A1 | 7/2007 | Un et al. |
| 2007/0171919 A1 | 7/2007 | Godman et al. |
| 2007/0183786 A1 | 8/2007 | Hinosugi et al. |
| 2007/0206551 A1 | 9/2007 | Moorti et al. |
| 2007/0217436 A1* | 9/2007 | Markley ............. H04L 12/2803 370/401 |
| 2007/0253379 A1 | 11/2007 | Kumar et al. |
| 2007/1028612 | 12/2007 | Kolakowski et al. |
| 2008/0037487 A1 | 2/2008 | Li et al. |
| 2008/0037589 A1 | 2/2008 | Kliger et al. |
| 2008/0080369 A1 | 4/2008 | Sumioka et al. |
| 2008/0089268 A1 | 4/2008 | Kinder et al. |
| 2008/0134271 A1* | 6/2008 | Qin ....................... H04W 52/50 725/118 |
| 2008/0178229 A1 | 7/2008 | Kliger et al. |
| 2008/0189431 A1 | 8/2008 | Hyslop et al. |
| 2008/0192752 A1* | 8/2008 | Hyslop et al. ........... 370/395.21 |
| 2008/0212591 A1 | 9/2008 | Wu et al. |
| 2008/0225832 A1 | 9/2008 | Kaplan et al. |
| 2008/0238016 A1 | 10/2008 | Chen et al. |
| 2008/0271094 A1 | 10/2008 | Kliger et al. |
| 2008/0273591 A1 | 11/2008 | Brooks et al. |
| 2008/0279219 A1 | 11/2008 | Wu et al. |
| 2009/0063878 A1 | 3/2009 | Schmidt et al. |
| 2009/0092154 A1 | 4/2009 | Malik et al. |
| 2009/0106801 A1 | 4/2009 | Horii |
| 2009/0122901 A1 | 5/2009 | Choi et al. |
| 2009/0165070 A1 | 6/2009 | McMullin et al. |
| 2009/0217325 A1 | 8/2009 | Kliger et al. |
| 2009/0252172 A1 | 10/2009 | Hare |
| 2009/0254794 A1 | 10/2009 | Malik et al. |
| 2009/0257483 A1 | 10/2009 | French et al. |
| 2009/0285212 A1 | 11/2009 | Chu et al. |
| 2009/0296578 A1 | 12/2009 | Bernard et al. |
| 2009/0316589 A1 | 12/2009 | Shafeeu |
| 2010/0031297 A1 | 2/2010 | Klein et al. |
| 2010/0080312 A1 | 4/2010 | Moffatt et al. |
| 2010/0150016 A1 | 6/2010 | Barr |
| 2010/0158013 A1 | 6/2010 | Kliger et al. |
| 2010/0158015 A1 | 6/2010 | Wu |
| 2010/0158021 A1 | 6/2010 | Kliger et al. |
| 2010/0158022 A1 | 6/2010 | Kliger et al. |
| 2010/0162329 A1 | 6/2010 | Ford et al. |
| 2010/0174824 A1 | 7/2010 | Aloni et al. |
| 2010/0185731 A1 | 7/2010 | Wu |
| 2010/0185759 A1 | 7/2010 | Wu |
| 2010/0238932 A1 | 9/2010 | Kliger et al. |
| 2010/0246586 A1 | 9/2010 | Ohana et al. |
| 2010/0254278 A1 | 10/2010 | Kliger et al. |
| 2010/0254402 A1 | 10/2010 | Kliger et al. |
| 2010/0281195 A1 | 11/2010 | Daniel et al. |
| 2010/0284474 A1 | 11/2010 | Kliger et al. |
| 2010/0290461 A1 | 11/2010 | Kliger et al. |
| 2010/0322134 A1 | 12/2010 | Wu |
| 2011/0013633 A1 | 1/2011 | Klein et al. |
| 2011/0080850 A1 | 4/2011 | Klein et al. |
| 2011/0205891 A1 | 8/2011 | Kliger et al. |
| 2011/0310907 A1 | 12/2011 | Klein et al. |

FOREIGN PATENT DOCUMENTS

| | | |
|---|---|---|
| EP | 0385695 A2 | 9/1990 |
| EP | 0622926 A2 | 11/1994 |
| EP | 1501326 | 1/2005 |
| JP | 60160231 A | 8/1985 |
| WO | WO-9827748 A2 | 6/1998 |
| WO | WO-9831133 A2 | 7/1998 |
| WO | WO-9935753 A2 | 7/1999 |
| WO | WO-9946734 | 9/1999 |
| WO | WO-0031725 | 6/2000 |
| WO | WO-0055843 | 9/2000 |
| WO | WO-0180030 | 10/2001 |
| WO | WO-0219623 A2 | 3/2002 |

OTHER PUBLICATIONS

U.S. Appl. No. 60/927,613. Hyslop, "Parameerized Quality of Service Architecture in a Network".*

U.S. Appl. No. 60/872,936, Qin.*

MoCA: Ubiquitous Multimedia Networking in the Home, Proc of SPIE vol. 6776 67760C-1, Shlomo Ovadia, SPIE, Bellingham, WA, May 28, 2010.

"Home Networking on Coax for Video and Multimedia, Overview for IEEE 802.1AVB", Shlomo Ovadia, San Ramon/California, May 30, 2007.

"Microtune Introduces Industry's First 1-GHZ Cable Tuners Compatible with MoCA—Home Networking Standard", Business Wire, San Francisco, California, Mar. 19, 2007.

Multichannel News , MoCA Brewing Up Bigger Bandwidth, Dec. 15, 2008 Interview with CTO Anton Monk, http://www.multichannel.com/article/160878-MoCa.sub.--Brewing.sub.--Up.su- b.--bigger.sub.--Bandwidth.php downloaded on Mar. 29, 2009.

* cited by examiner

APPARATUS AND METHODS FOR REDUCTION OF TRANSMISSION DELAY IN A COMMUNICATION NETWORK

CROSS REFERENCE TO RELATED APPLICATION

This application is a continuation of U.S. patent application Ser. No. 12/041,368, entitled "Apparatus and Methods for Reduction of Transmission Delay in a Communications Network" which was filed on Mar. 3, 2008 and which is a nonprovisional of U.S. Application No. 60/941,020, filed on May 31, 2007, both of which are incorporated by reference herein in their respective entireties.

FIELD OF THE INVENTION

The present invention relates generally to communication networks and specifically to optimizing bandwidth utilization in a coordinated network based on a coaxial cable backbone.

BACKGROUND OF THE INVENTION

Many structures, including homes, have networks based on coaxial cable ("coax").

The Multimedia over Coax Alliance ("MoCAT™"), provides at its website (www.mocalliance.org) an example of a specification (viz., that available under the trademark MoCA), which is hereby incorporated herein by reference in its entirety, for networking of digital information, including video information, through coaxial cable. The specification has been distributed to an open membership.

Technologies available under the trademark MoCA, and other specifications and related technologies (collectively, with MoCA, "the existing technologies"), often utilize unused bandwidth available on the coax. For example, coax has been installed in more than 70% of homes in the United States. Some homes have existing coax in one or more primary entertainment consumption locations such as family rooms, media rooms and master bedrooms. The existing technologies allow homeowners to utilize installed coax as a networking system for the acquisition and use of information with high quality of service ("QoS").

The existing technologies may provide high speed (270 mbps), high QoS, and the innate security of a shielded, wired connection combined with packet-level encryption. Coax is designed for carrying high bandwidth video. Today, it is regularly used to securely deliver millions of dollars of pay-per-view and video content on a daily basis.

Existing technologies provide throughput through the existing coaxial cables to the places where the video devices are located in a structure without affecting other service signals that may be present on the cable.

The existing technologies work with access technologies such as asymmetric digital subscriber lines ("ADSL"), very high speed digital subscriber lines ("VDSL"), and Fiber to the Home ("FTTH"), which provide signals that typically enter the structure on a twisted pair or on an optical fiber, operating in a frequency band from a few hundred kilohertz to 8.5 MHz for ADSL and 12 MHz for VDSL. As services reach such a structure via any type of digital subscriber line ("xDSL") or FTTH, they may be routed via the existing technologies and the coax to the video devices. Cable functionalities, such as video, voice and Internet access, may be provided to the structure, via coax, by cable operators, and use coax running within the structure to reach individual cable service consuming devices in the structure. Typically, functionalities of the existing technologies run along with cable functionalities, but on different frequencies.

The coax infrastructure inside the structure typically includes coax, splitters and outlets. Splitters typically have one input and two or more outputs and are designed to transmit signals in the forward direction (input to output), in the backward direction (output to input), and to isolate outputs from different splitters, thus preventing signals from flowing from one coax outlet to another. Isolation is useful in order to a) reduce interference from other devices and b) maximize power transfer from Point Of Entry ("POE") to outlets for best TV reception.

Elements of the existing technologies are specifically designed to propagate backward through splitters ("insertion") and from output to output ("isolation"). One outlet in a structure can be reached from another by a single "isolation jump" and a number of "insertion jumps." Typically isolation jumps have an attenuation of 5 to 40 dB and each insertion jump attenuates approximately 3 dB. MoCA™-identified technology has a dynamic range in excess of 55 dB while supporting 200 Mbps throughput. Therefore MoCA™-identified technology can work effectively through a significant number of splitters.

Networks based on the existing technologies are often coordinated networks, in which a processing unit serves as a network coordinator. The coordinator defines medium access plan ("MAP") cycles, prospectively assigns data transmission events to the cycles, and serially processes the cycles by executing or coordinating the events in each cycle. Coordinated network schemes, such as MoCA™-identified technology, may be used for transmission of streaming video and thus data throughput between outlets is desirable.

FIG. 1 shows known data flow 100 that may be implemented in a coordinated network. In data flow 100, network coordinator 102 grants only explicit reservation requests (i.e., a transmission opportunity is scheduled only to a granted reservation request made by the transmitter on a per frame or aggregated frame basis). Upon receiving reservation requests, network coordinator 102 grants and schedules transmission opportunities in the next MAP cycle. For example, network coordinator 102 grants transmission opportunities to requesting transmitter nodes such as transmitting node 104. Network coordinator 102 periodically allocates a reservation request opportunity ("RR Opportunity"), such as 106 in MAP Cycle i, to transmitting node 104. In response to RR Opportunity 106, transmitting node 104 transmits in MAP Cycle i+1 reservation request ("RR") 108 for the transmission of data frame k. Network coordinator 102 responds in MAP Cycle i+1 by transmitting to transmitting node 104 frame k transmission grant 110. In MAP Cycle i+2, transmitting node 104 transmits data frame k to receiving node 112 in frame k transmission 111. Data flow 100 includes subsequent exchanges between network coordinator 102 and transmitting node 104 in connection with data frame m: viz., RR Opportunity 114, RR 116, frame m transmission grant 118 and frame m transmission 119.

Data flow 100 has an average latency of three MAP cycles between the receipt of an Ethernet packet by transmitting node 104 and reception of the packet at receiving node 112. In existing technologies such as that identified by MoCA™ the nominal MAP cycle duration is 1 millisecond ("ms"), yielding a temporal latency of 3 ms. Such latency may limit the ability of the existing technologies to support time sensitive applications such as Ethernet AV (audiovisual) Bridging, including class 5 AVB data transfer.

FIG. 2 shows typical communication network 200, which includes network segments 202, 204 and 206. Network segments 202 and 206 are Ethernet packet-switched segments and network segment 204 is a shared media packet mode network segment that requires a network coordinator. Packet-switched network segments 202 and 206 require architectural and message passing characteristics that are different from those required by packet mode network segment 204. For example, legacy switch 208 in packet switched segment 202 may not be configured for exchanging audiovisual data. As another example, Ethernet hub 210 in packet switched segment 204 may operate based on a half duplex protocol, whereas AV switch 212 in packet mode segment 206 may require a full duplex protocol. As a result of protocol mismatching, the quality of communication of audiovisual data from AV device 214 in segment 202 to device 216, which may be a display, in segment 204 may be degraded or be subject to latency delays.

It therefore would be desirable to provide systems and methods for reducing latency in coordinated networks.

It therefore also would be desirable to provide systems and methods for Ethernet AV bridging using shared media networks.

SUMMARY OF THE INVENTION

Systems and methods for reducing latency in coordinated networks, and for performing Ethernet AV bridging, are provided substantially as shown in and/or described in connection with at least one of the figures, and as set forth more completely in the claims.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION OF EMBODIMENTS

Figure 1:
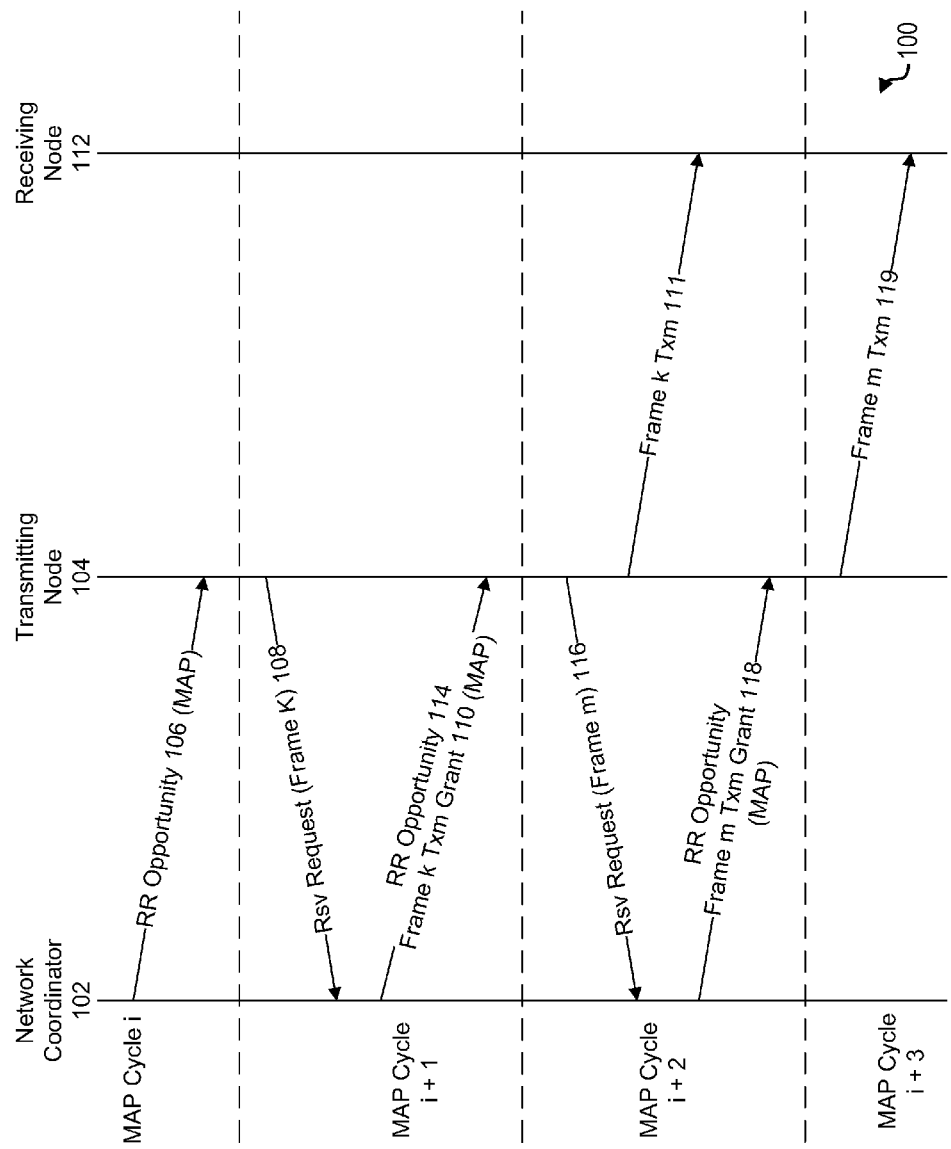
FIG. 1 shows a diagram of a known data flow in a coordinated shared media communication network.
Figure 2:
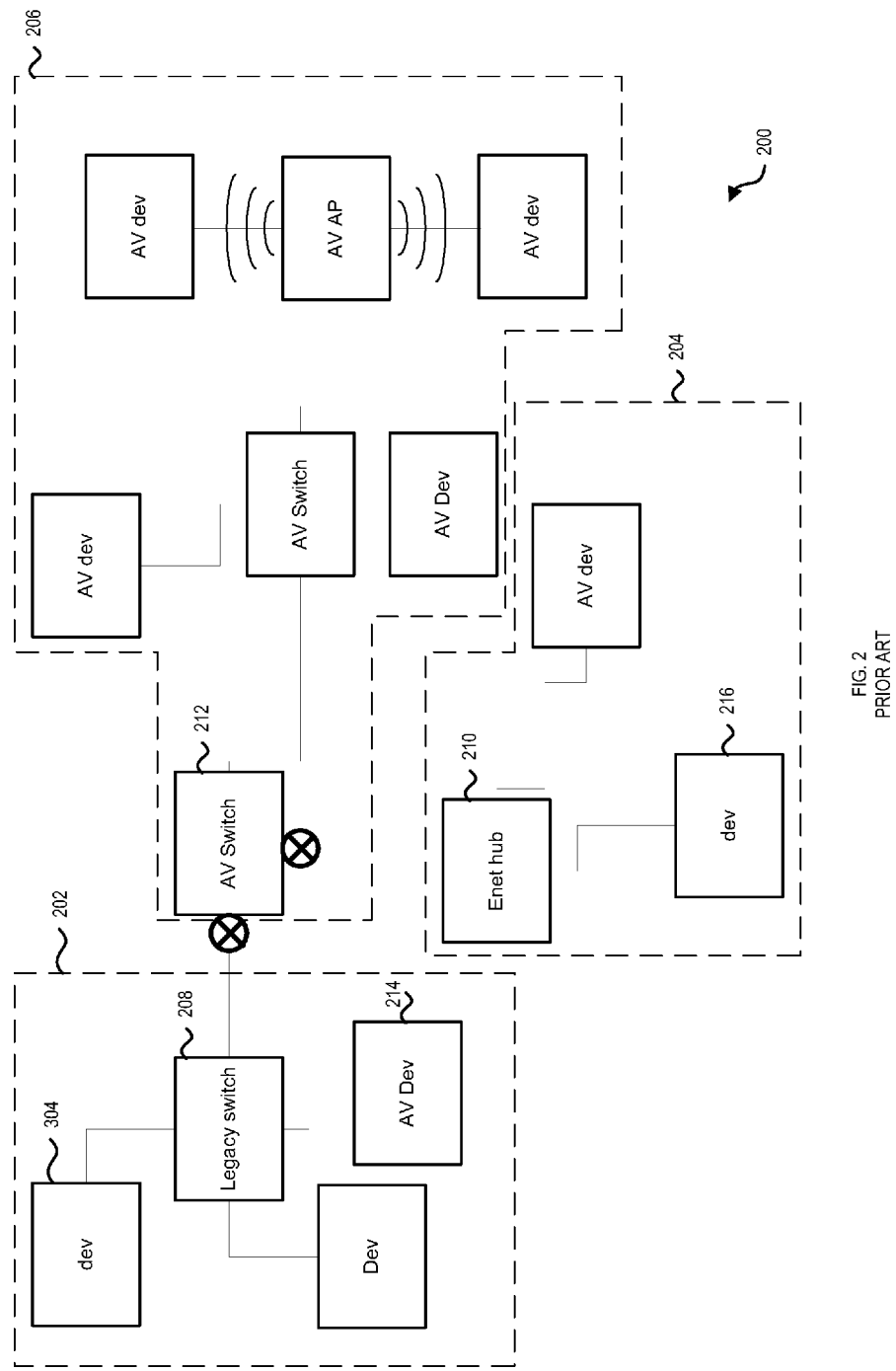
FIG. 2 shows a known arrangement of interfaced communication network segments.

Apparatus and methods for reducing latency in coordinated networks are provided in accordance with the principles of the invention. The apparatus and methods relate to a protocol that may be referred to herein as the Persistent Reservation Request ("p-RR"), which may be viewed as a type of RR (reservation request). In some embodiments of the invention, p-RR can reduce latencies, on average, to one MAP cycle or less. In some embodiments of the invention, a persistent reservation request may be used to facilitate Ethernet audiovisual bridging. Apparatus and methods of the invention may be used in connection with networks that are described in one or more of MoCA® Specifications v1.0, February 2006; MoCA® Specifications v1.1 Extensions, May 2007; and IEEE802.1 AVB WG Specifications, all of which are incorporated by reference herein in their entireties.

Methods in accordance with the principles of the invention may include a method for managing transmission of data over a shared media communication network. The method may include receiving from a node a first reservation request. The reservation request may request allocation of network resources for transmitting the data. The method may further include establishing a data flow based on the request, wherein the node transmits at least two data frames before a second reservation request is received. The flow may have a duration that is greater than the duration of one medium access plan cycle. The reservation request may include a traffic specification ("TSPEC"). Some embodiments of the invention may include canceling the flow based on information included in the traffic specification and/or canceling the flow based on the execution of a link maintenance operation ("LMO") process. Some embodiments of the invention may include managing jitter by allocating network resources during only a portion of one or more MAP cycles.

An exemplary device in accordance with the principles of the invention may be configured to manage transmission of data over a shared media communication network. The device may include a receiver module configured to receive a first reservation request from a node in communication with the network; a processor module configured to allocate network resources based on the request; and a transmitter module configured to inform the node about a grant of the request. The grant may authorize the node to transmit at least two data frames before the node transmits a second reservation request.

Some methods in accordance with the principles of the invention may include providing Ethernet AV bridging using coordinated shared media networks. Those methods may include transmitting multicast information from a first node to a second node. The first node may reside in a packet mode network and the second node may reside in a packet-switched network. The method may include receiving at the first node a registration request from the second node. The registration request may request receipt of the multicast information and may include a TSPEC. The method may further include transmitting, via the first node, a reservation request to a network coordinator residing in the packet mode network. The reservation request may conform to the traffic specification.

Some methods for Ethernet AV bridging in accordance with the principles of the invention may include using a packet mode network to transmit data from a first packet-switched network segment to a second packet-switched network segment. The methods may include receiving the data from the first segment using a packet mode network ingress port and transmitting the data to the second segment using a packet mode network egress port.

FIGS. 3-10 show illustrative embodiments and features of the invention.

Figure 3:
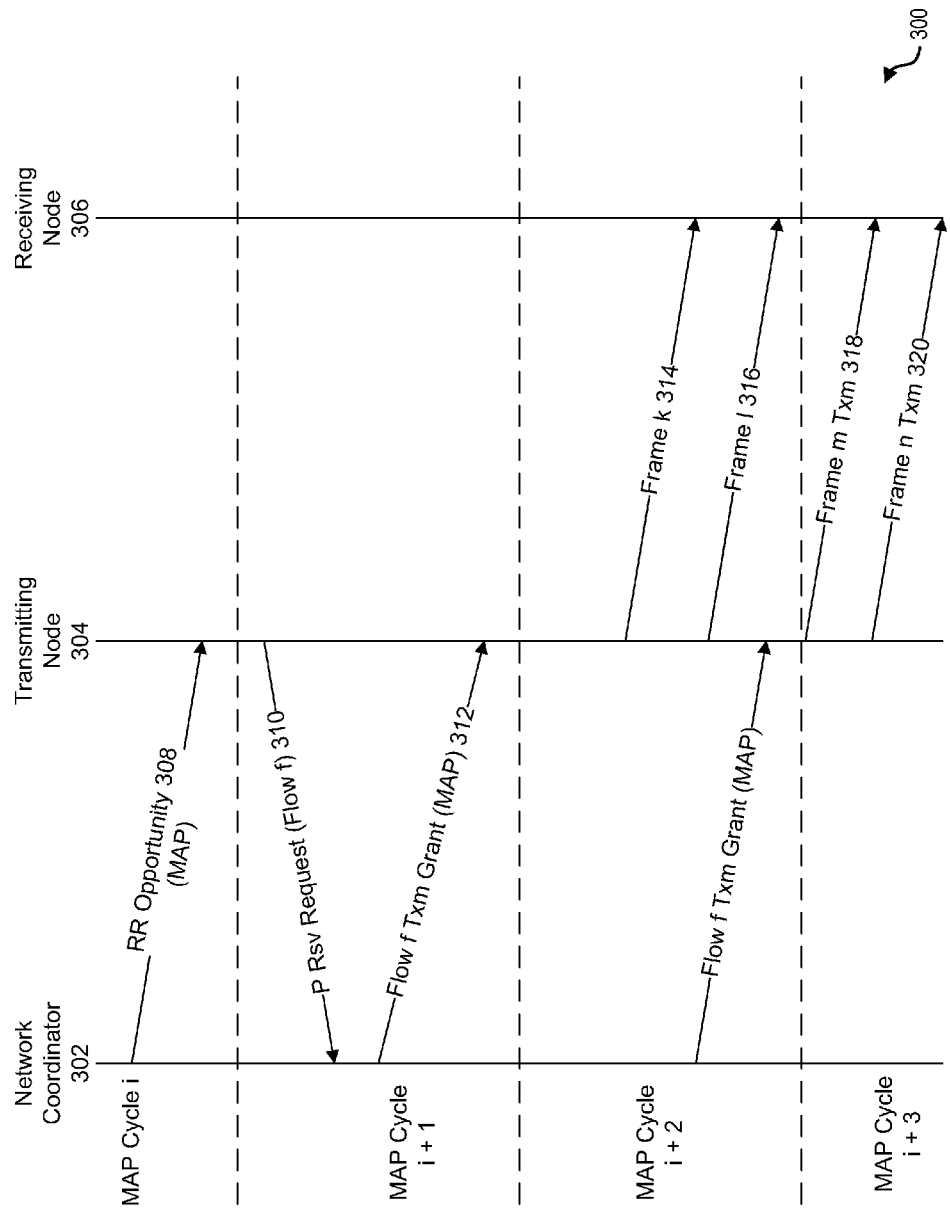
FIG. 3 shows a diagram of a data flow in accordance with the principles of the invention.

FIG. 3 shows illustrative p-RR data flow 300 that may be used to reduce latency in a coordinated shared media network. Data flow 300 may involve network coordinator 302, transmitting node 304, and receiving node 306. In MAP Cycle i, network coordinator 302 transmits to transmitting node 304 RR Opportunity 308. In MAP Cycle i+1, transmitting node 304 transmits to network coordinator 302 p-RR 310, which is a persistent request for network allocation of network resources for subsequent transmission, during the lifetime of flow f, of data frames to receiving node 306. Before the end of MAP Cycle i+1, network coordinator 302 grants p-RR 210 for flow f by transmitting to transmitting node 304 flow f transmission grant 312. Based on grant 312, transmitting node 304 may transmit to receiving node 306 data frames such as frames k (314), 1 (316), m (318) and n (320).

The aforementioned MoCA 1.1 specification includes protocol pQoS (parameterized QoS), which supports parameterized QoS (Quality of Service) flow transactions over a network. In pQoS flow, a transmitting node sends a TSPEC admission request to a receiving node, as described in MoCA 1.1 section 4.2. After the request is accepted, a flow is created and data transmission between the transmitting and receiving nodes occurs in accordance with the protocol described above in connection with FIG. 1.

In some embodiments of the invention, after a pQoS flow is created, the transmitting node may use the flow's TSPEC to generate a p-RR for the flow and send the p-RR to the network coordinator ("NC"). Table 1 shows illustrative information that may be included in the p-RR

TABLE 1

Illustrative p-RR Information

| p-RR Information | Characteristics |
| --- | --- |
| Leased time | Copied from the flow's TSPEC. Indicates length of time period during which the p-RR applies. |
| Packet duration | Derived from the TSPEC nominal packet size and calculated for the connection current PHY profile (bit loading). |
| Mean time | Indicates the required mean time-between-transmission-grants to meet latency requirements (multiple transmissions may be allocated by the network controller to a flow within a single MAP cycle) |

In some embodiments, after the NC receives the p-RR, it can allocate to the transmitting node network resources for the flow based on the p-RR information, such as the leased time. In some embodiments, the p-RR may be allowed to persist (and is thus referred to as a "persistent grant" or "PG") until a new p-RR for the same flow is received. When a node transmits exclusively audiovisual bridge traffic, and is operating under a persistent grant, there is no need to poll it frequently (every or almost every MAP CYCLE) as is usually done in MoCA1.0 networks. This may reduce overhead and improve network throughput.

In response to the p-RR, the NC may allocate to the transmitting node a time-limited transmission opportunity. The time interval between consecutive transmission opportunities (viz., the "transmission ('Tx') service time"), could be significantly smaller than the MAP cycle duration to accommodate the requirements of specific time sensitive traffic moving over the network. In some embodiments, a maximum Tx service time may be 100 µs when the MAP cycle duration is 1 ms.

If an LMO process (MoCA 1.0 section 3.7) causes a change in the connection profile associated with the transmitting and receiving nodes, the transmitting node may send an updated p-RR. If the data rate between the transmitting and receiving nodes changes, for example, as a result of an LMO process, the transmitting node may renew its p-RR. If the transmitting node fails to renew its p-RR, the NC may, after a predetermined number of MAP cycles, discontinue p-RR grants for the flow and send to the transmitting node a new p-RR opportunity. The NC may allocate a p-RR opportunity to the transmitting node after each LMO process between the transmitting and the receiving nodes. The allocation of a p-RR opportunity after each LMO process may be conditioned on the time remaining before the leased time expires.

Figure 4:
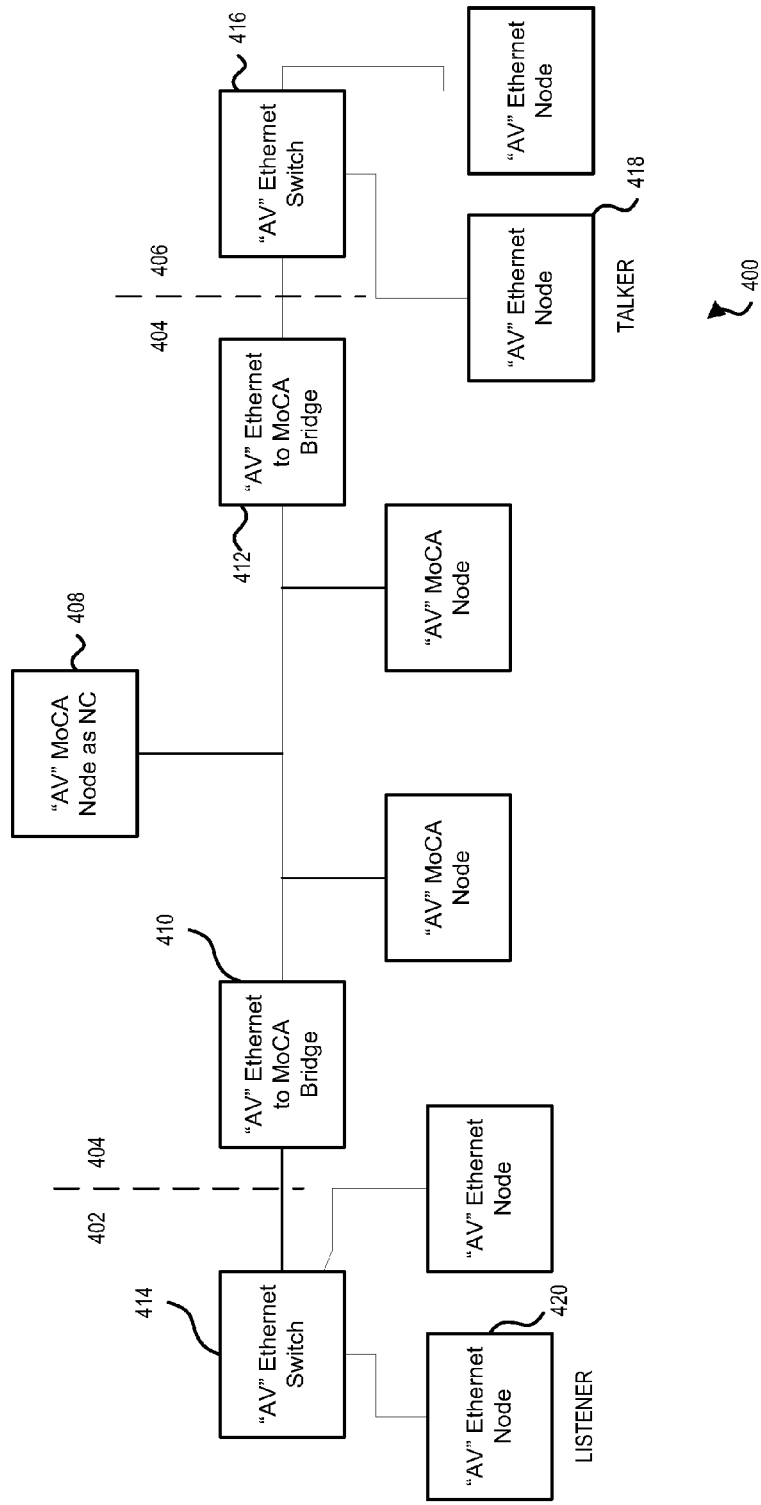
FIG. 4 shows an arrangement of communication network segments that may be used in accordance with the principles of the invention.

FIG. 4 shows illustrative communication network 400 in which persistent reservation requests in accordance with the principles of the invention may be used to provide AV bridging, such as Ethernet AV bridging, between packet switched network segments 402 and 406 using packet mode network segment 404. Segment 404 may include network coordinator 408 and AV bridges 410 and 412 that interface, respectively, with packet switches 414 and 416. Bridges 410 and 412 may, together with network coordinator 408, establish a data flow that is based on a p-RR such as that described above in connection with FIG. 3. Based on such a data flow, talker node 418 (which resides in packet switched network segment 406) may stream AV data to listener node 420 (which resides in packet switched network segment 402) via packet mode network segment 404 (which is managed by network coordinator 408).

Figure 5:
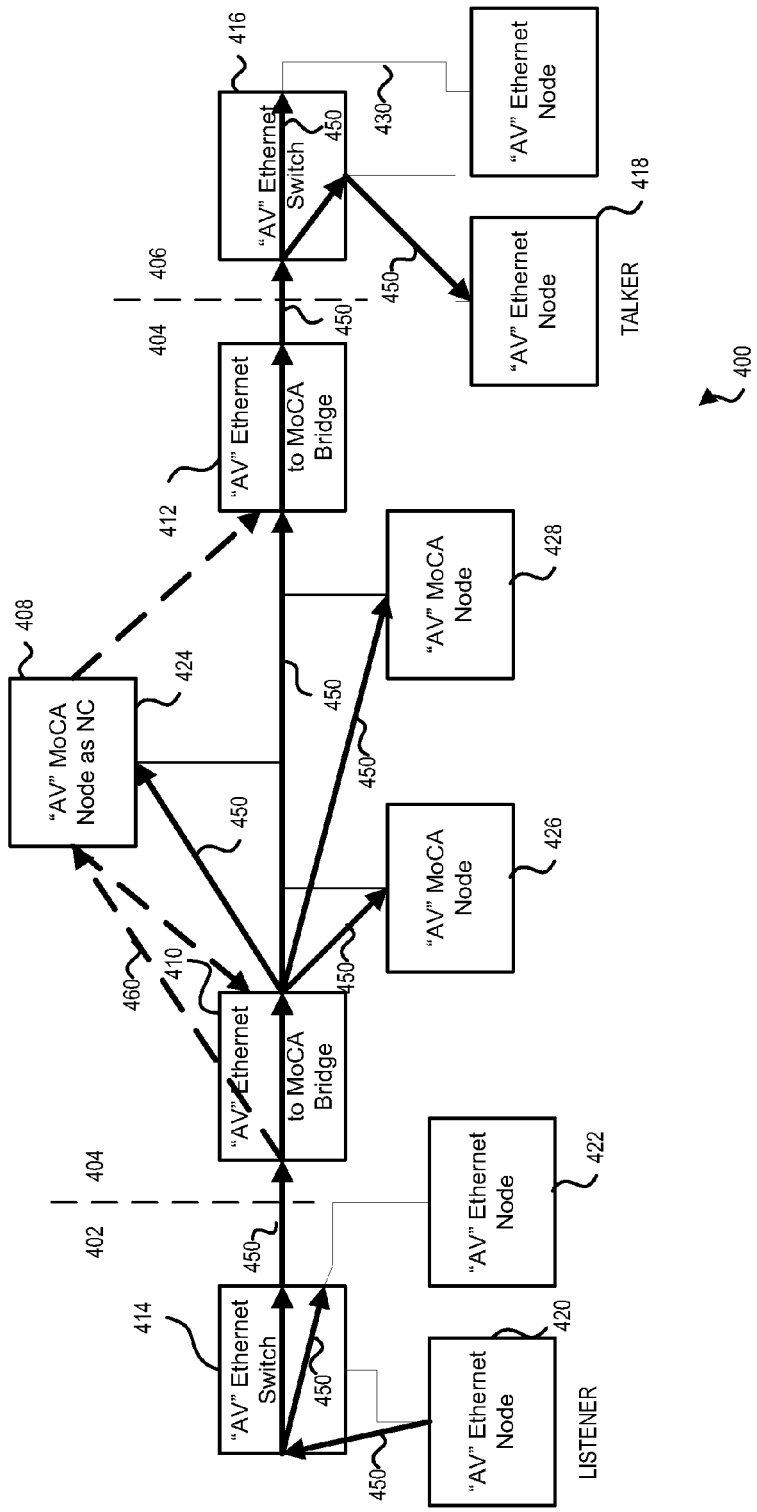
FIG. 5 shows the arrangement of FIG. 4 in use in accordance with the principles of the invention.

Packet switched network data streaming protocols (such as the stream reservation protocol ("SRP") defined by IEEE standard 802.1Qat) often require registration by a listener node. The registration identifies to a talker node that the listener node desires to receive a data stream. After registration, such protocols require that the talker node transmit a reservation to reserve network resources along a path from talker to listener. FIG. 5 shows an illustrative example, according to the principles of the invention, of how packet mode network segment 404 may bridge between talker node 418 and listener node 420, which communicate under a streaming protocol such as that defined by IEEE 802.1Qat. The network segments, and elements that make up the segments, are the same as those shown in FIG. 4.

FIG. 5 shows an illustrative registration process, with a packet mode network serving as a backbone, and bridging, between packet switching network segments. The process originates when listener node 420, in packet switched network segment 402, transmits registration 450 to AV Ethernet switch 414. Switch 414 propagates registration 450 to packet mode bridge 410, which then functions as a network segment ingress node, in packet mode network segment 404. Bridge 410 propagates registration 450 to bridge 412, which then functions as a network segment egress mode for network segment 404. Bridge 410 transmits registration notification 460 to network coordinator 408, which propagates notification 460 to one or more ingress and egress bridges, including bridges 410 and 412. Registration 450 may also be propagated to nodes that do not use registration 450. In communication network 400, those nodes include 420, 422, 424, 426, 428 and 430.

From bridge 412, registration 450 is propagated to talker 418. It will be appreciated that inter-node communications regarding registration, notification, reservation and other information may require suitable modification of the communications, but for the sake of clarity, such modifications are ignored in FIGS. 5 and 6 and the same reference numeral is used to identify such a communication at more than one stage of propagation.

Figure 6:
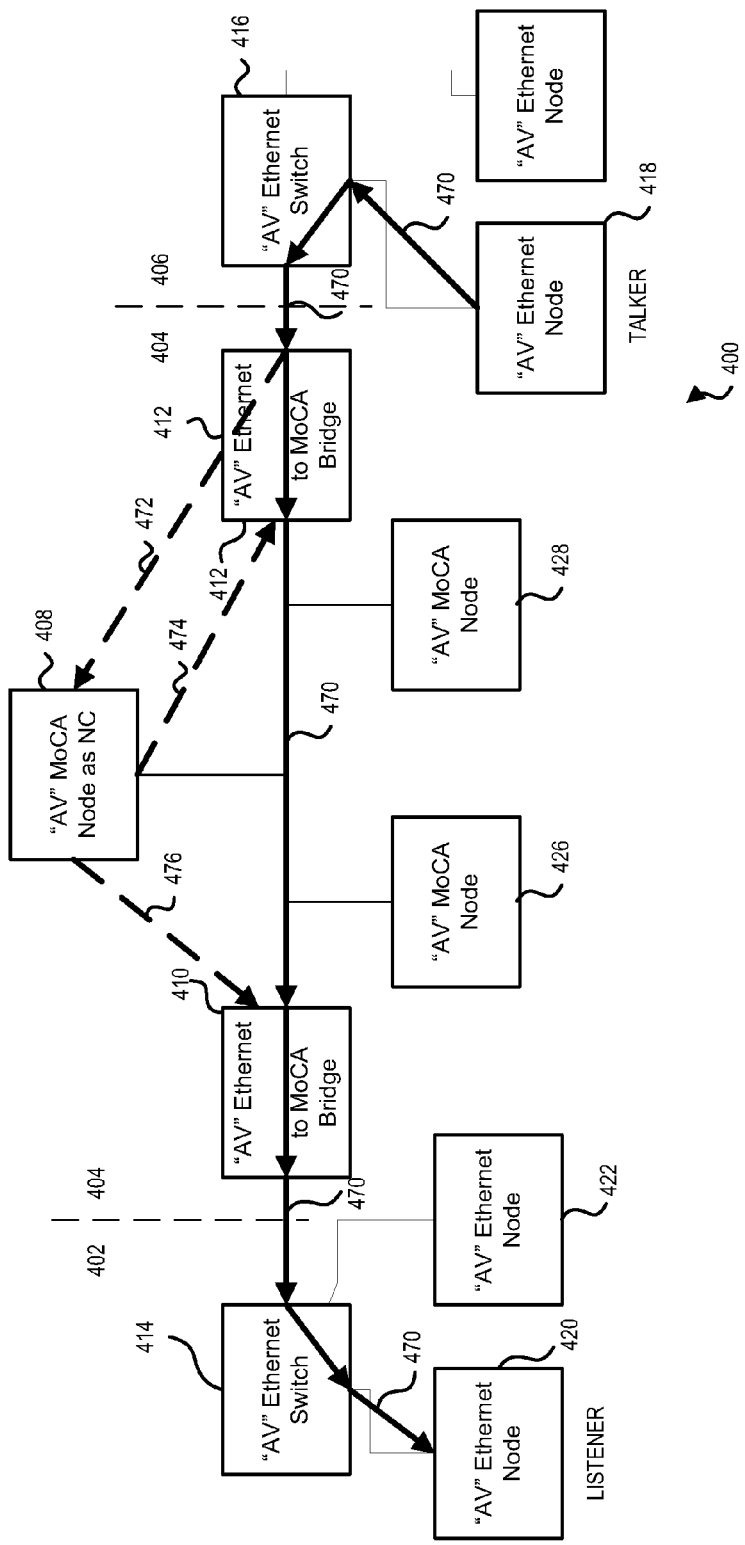
FIG. 6 also shows the arrangement of FIG. 4 in use in accordance with the principles of the invention.

FIG. 6 shows an illustrative reservation process that corresponds to the registration process shown in FIG. 5. Packet mode network segment 404 is shown serving as a backbone, and bridging, between packet switching network segments 402 and 406 in connection with the reservation process. In a packet switching network or network segment subject to a QoS protocol, a talker node transmits a reservation message to reserve downstream network resources. In the illustrative reservation process shown in FIG. 6, talker node 418 (in packet switched network segment 406) transmits reservation message 470 to reserve network resources for data transmission to listener 420 (in packet switched network segment 402). Reservation message 470 is received by AV bridge 412. AV bridge 412 then transmits data flow reservation 472 (for a data flow within packet mode network segment 404) to network coordinator 408, which may respond by transmitting data flow grant 474 to bridge 412. The data flow in network segment 404 may be a parameterized quality of service ("pQoS") flow, which may have a protocol that supports persistent reservation requests (p-RR). AV bridge 412 may transmit a p-RR to network coordinator 408 in the same MAP cycle as the data flow is requested. AV bridge 412, acting as ingress node, may propagate reservation message 470 to bridge 410, which acts as egress node.

When bridge 412 receives reservation message 470 from switch 416 (in packet switched network segment 406), bridge 412 may reject or accept reservation message 470. Bridge 412 may do so based on the availability of bridge 412 resources. Bridge 412 may query network coordinator 408 regarding the availability of resources in packet mode network segment 404. Network coordinator 408 may communicate reservation message 470 to bridge 410 along path 476. Bridge 410 may then propagate reservation message 470, via switch 414, to listener node 420.

The P802.1Qat SRP is a one-way declarative protocol with reservation messages propagated from the talker towards listeners. It typically contains no backward propagated acknowledgement or status report messages. If needed, a talker node could leverage higher layer applications for getting feedback from listeners. A talker can also simply initiate the reservation message and then wait enough time before starting data transmission to ensure that the stream data can be served appropriately.

A registration event may be initiated by a listener and passed by intermediate bridges, such as those of network segment 404. The talker node may be triggered by the registration event, which indicates that the listener node desires to establish a stream (data flow). Upon the registration event, the talker node may attempt to reserve the required resources in the local node and, for a shared media LAN, the talker may attempt to reserve resources on the LAN to which the talker node's egress port is attached. The talker may configure itself appropriately according to the local and LAN reservation message results. It then may record the result into the status information field of an updated reservation message and send the message toward the listener node.

SRP assumes that an admission control policy (which governs the disposition of a request by a node that resides in one network segment for network resources that reside in a different network segment) is implemented by a network segment egress port (e.g., switch 416, shown in FIG. 6) rather than an ingress port (e.g., bridge 412, shown in FIG. 6). When the egress port is connected to a point-to-point link (e.g., a packet switched network segment), the egress node can make admission control decisions according to its own policy. When the egress port is connected to a shared media LAN (such as packet mode network segment 404), a segment resource manager for the LAN, such as a network controller (e.g., controller 408), or some kind of distributed cooperation between all the ports on this LAN may be needed. The implementation of admission control policy of a local node or segment resource manager may be according to suitable known policies.

Reservation messages may be propagated over a subtree (e.g., a virtual LAN) by which the talker and listeners are connected. For each receiving bridge along the path from the talker to listeners, reservation messages can convey the result of resource reservation of the upstream bridges, and may trigger any necessary local or shared media LAN resource reservation operations.

In certain embodiments of the invention, a talker node, such as 418, may refresh a reservation message on a regular basis. Each listener, such as 420, may keep a timer which will timeout the registration request if there is no corresponding reservation message received during the timer period.

On receiving the first reservation message of a stream, some embodiments of the invention may allow a bridge to create a reservation record for the reservation message. The reservation record may contain information obtained from the reservation message. This information can include stream identifier, talker MAC address, traffic specification, upstream reservation status, reservation message inbound port and any other suitable information.

If a bridge, such as 412 (shown in FIG. 6), receives a reservation message that carries a positive reservation status, the bridge may reserve the required resources for each egress port that corresponds to a listener that has registered for a data stream. Preferably, the bridge can configure its local forwarding resources. On shared media LANs, such as package mode network segment 404, the network coordinator may reserve resources according to the upstream reservation results, and then transmit the reservation message out of each registered egress port. Each reservation message carries the updated reservation status and per-hop resource details according to the local/LAN reservation result on the corresponding port.

Because SRP is a one way declarative protocol, a failed reservation in an intermediate bridge will not influence any reservation that has been made upstream. Relevant listeners can receive reservation messages with negative reservation status. For example, a listener could choose to either withdraw the registration (e.g., by sending an update message corresponding to the registration), therefore releasing any unnecessary reserved resources, or keep the registration. By keeping the registration, the stream reservation can be made along the whole path when all necessary resources become available.

If the received reservation message carries a negative reservation status, the bridge can preferably configure its forwarding resources appropriately, update the per-hop resource details information in the reservation message, and then transmit the reservation message out of each registered egress port.

After a reservation record has been created, a bridge could later receive a reservation message that is inconsistent with the reservation record. While a discrepancy in the talker MAC address may be reported as an error and the reservation message rejected, a discrepancy in traffic specification, upstream reservation status, and reservation message inbound port may be accepted or rejected by the bridge based on predetermined policy.

Figure 7:
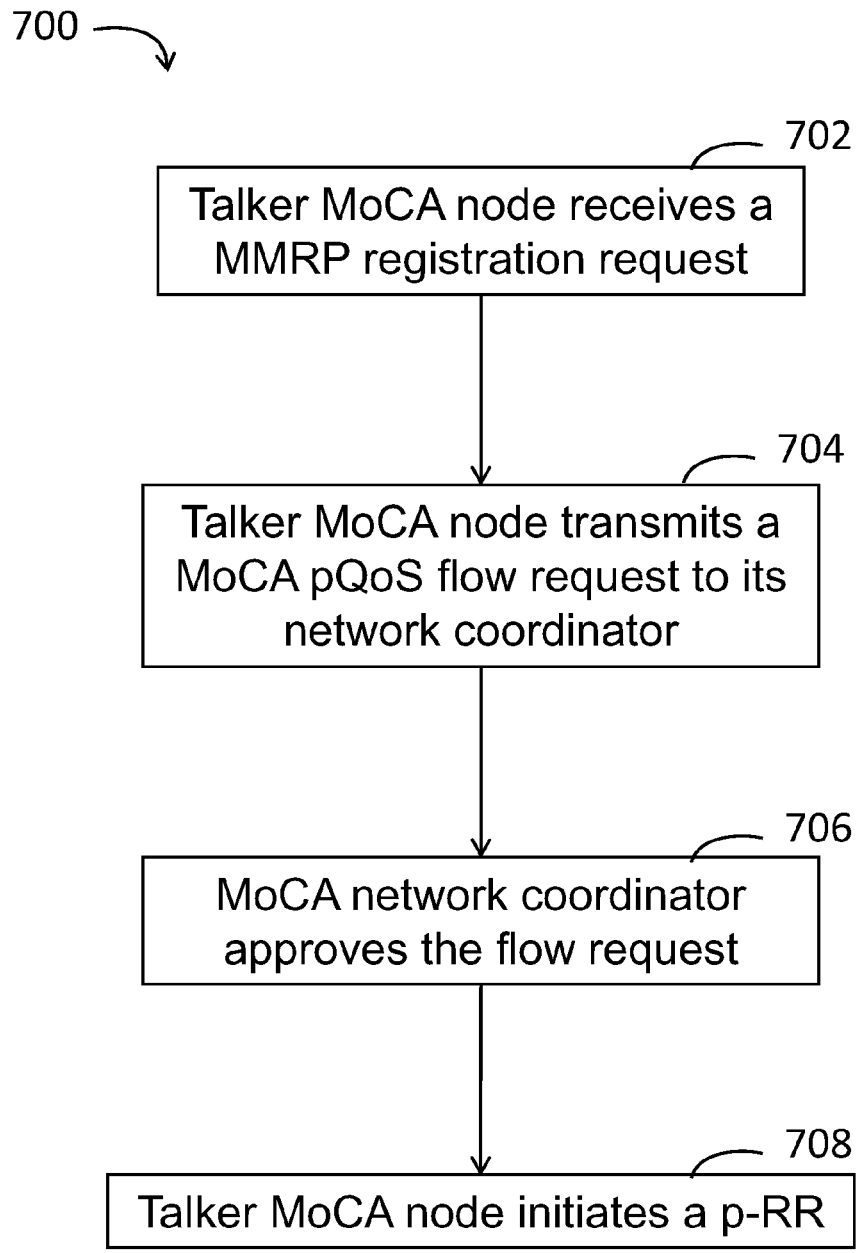
FIG. 7 shows a process in accordance with the principles of the invention.

FIG. 7 shows illustrative process 700, which may provide Ethernet AV bridging when a packet mode network segment node is a talker for a prospective multicast to nodes in a packet switched network. FIG. 7 illustrates process 700 using the example of a node in a network having protocols defined by a MoCA specification such as one of those identified above. At step 702, the talker MoCA node receives a multiple MAC address registration protocol ("MMRP") registration message. At step 704, the node may transmit a MoCA pQoS flow request to its network coordinator. At step 706, the network coordinator approves the flow request. At step 708, the MoCA node may initiate a p-RR, such as that shown and described above. Alternatively, the node may initiate an RR in every MAP cycle. The p-RR and the RR may be consistent with a TSPEC that may be embedded in the MMRP.

Figure 8:
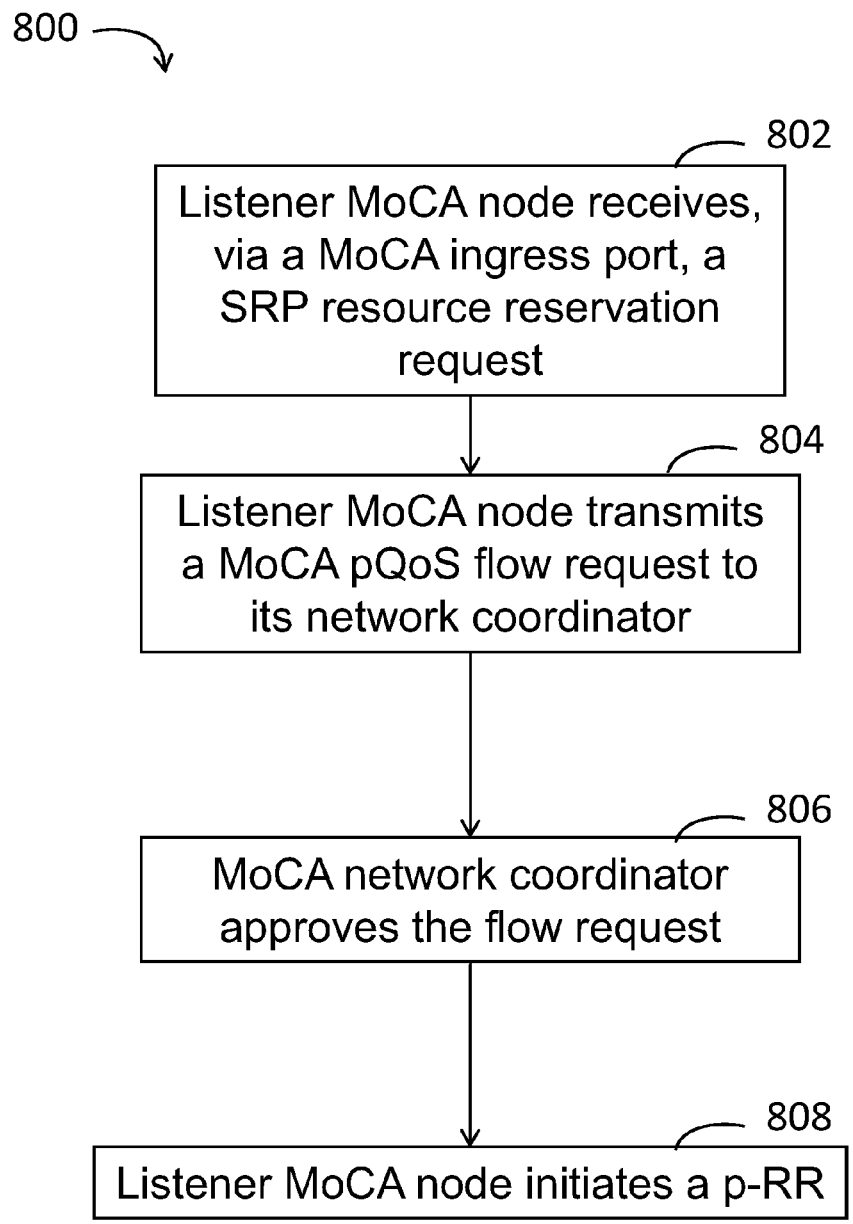
FIG. 8 shows another process in accordance with the principles of the invention.

FIG. 8 shows illustrative process 800, which may provide Ethernet AV bridging when a packet mode network segment node is a listener node for a prospective multicast originating in a packet switched network. FIG. 8 illustrates process 802 using the example of a node in a network having protocols defined by a MoCA specification such as one of those identified above. At step 802, the listener MoCA node receives, via a MoCA ingress port, a stream request protocol ("SRP") resource reservation message. At step 804, the node may transmit a MoCA pQoS flow request to its network coordinator. The flow request may be for the establishment of a flow with the MoCA ingress port through which the data stream will flow. At step 806, the network coordinator approves the flow request. At step 808, the MoCA node may initiate a p-RR, such as that shown and described above. Alternatively, the node may initiate an RR in every MAP cycle. The p-RR and the RR may be consistent with a TSPEC that may be embedded in the SRP.

Figure 9:
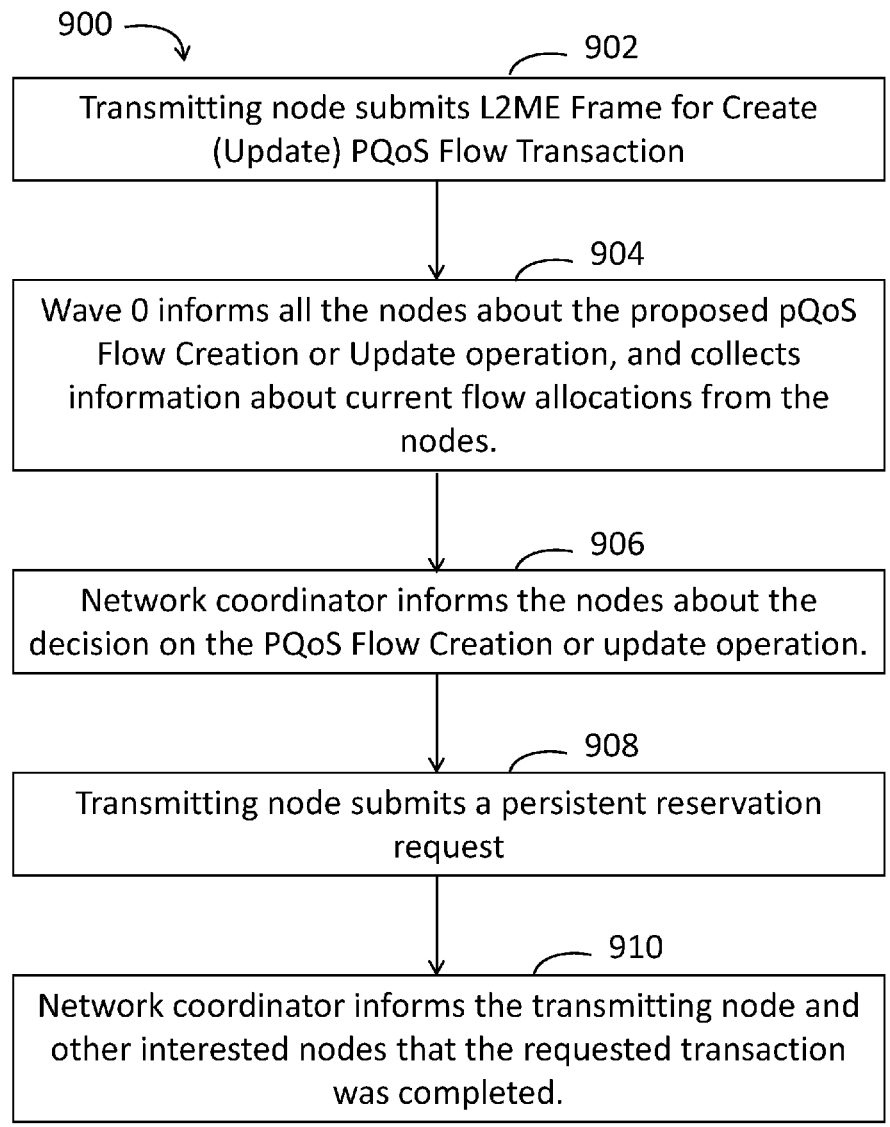
FIG. 9 shows yet another process in accordance with the principles of the invention.

FIG. 9 shows illustrative method 900 for using a p-RR to couple a network coordinator flow request grant to the data flow itself. Process 900 may be implemented for reducing latency in a coordinated shared media network and/or for providing Ethernet AV bridging. In process 900 a p-RR is embedded as extra fields in pQoS Flow Request (see steps 704 and 804 in FIGS. 7 and 8, respectively). At step 902, a MoCA node that desires to transmit data (the "transmitting node") transmits to its network coordinator a layer 2 management entity ("L2ME") frame for creating (or updating) a pQoS flow. At step 904, the network coordinator issues Wave 0, in which all nodes in the MoCA network segment are informed about the proposed pQoS flow, and collects resource allocation information from the MoCA network segment nodes. At step 906, the network coordinator issues Wave 1, in which the MoCA network segment nodes are informed about the coordinators disposition (e.g., grant or denial) of the request for a pQoS flow. At step 908, the network coordinator issues Wave 2, in which the transmitting node transmits to the network coordinator a p-RR (which may be in a form defined in the specification MoCA 1.0, section 3.9.1.1). At step 910, the network coordinator issues Wave 3, in which the transmitting node, and any other interested nodes, are informed that the requested data flow was completed. (Under Wave 3 protocols, the NC notifies other nodes regarding the occurrence of some events, such as the grant or denial of a p-RR. When a p-RR is granted, the NC may notify the nodes regarding the amount of bandwidth that remains available after the p-RR is granted.)

Figure 10:
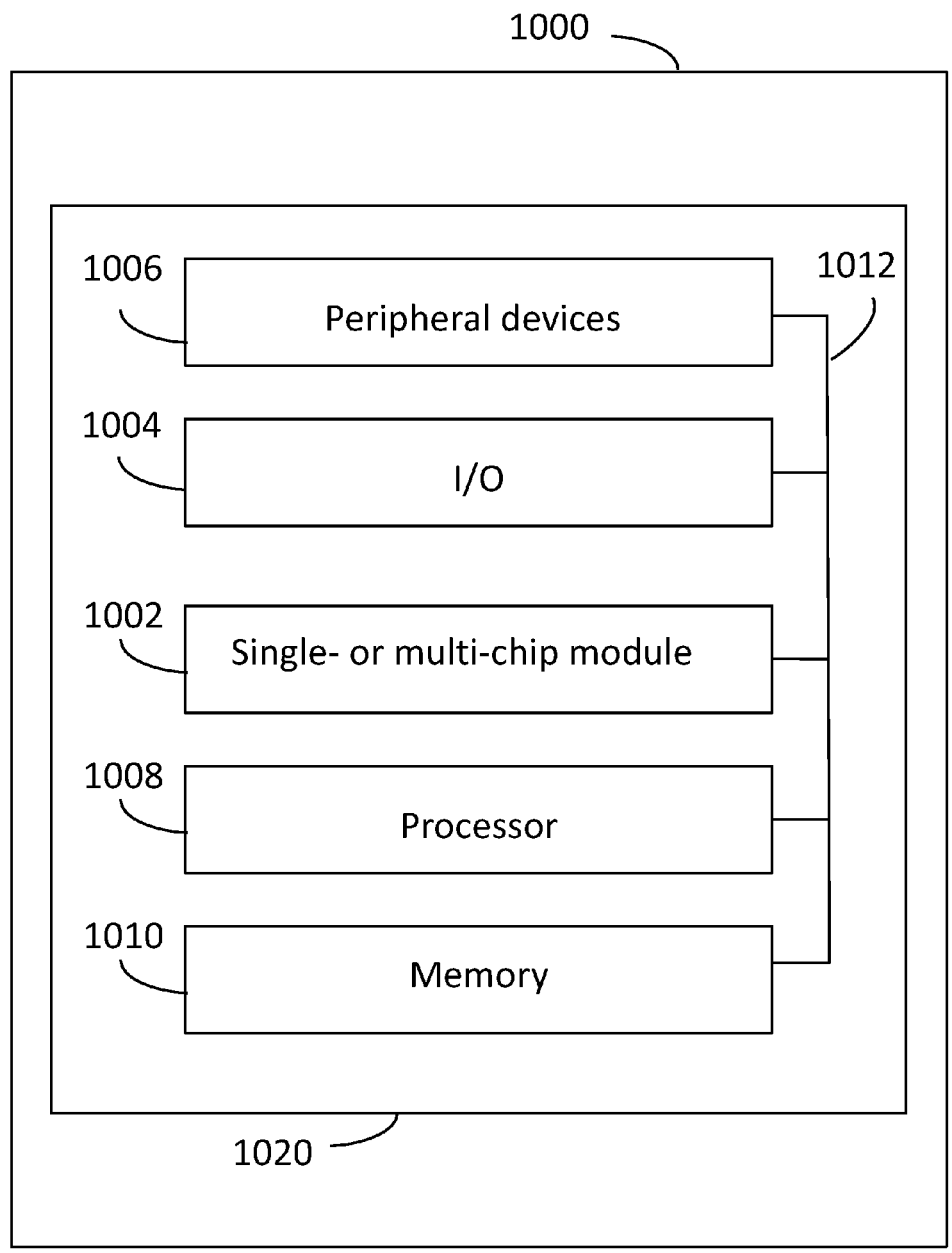
FIG. 10 shows a device in accordance with the principles of the invention.

FIG. 10 shows an illustrative embodiment of device 1000 that may correspond to a node in a managed shared media network, such as package mode network segment 404 (shown in FIG. 4). Device 1000 may reduce latency in a coordinated shared media network and/or may provide Ethernet AV bridging. Device 1000 may include single or multi-chip module 1002, which can be one or more integrated circuits, and which may include logic configured to: request a data flow; grant a data flow request; transmit or receive an RR; transmit or receive a p-RR; transmit or receive a reservation message; or to perform any other suitable logical operations. Device 1000 may include one or more of the following components: I/O circuitry 1004, which may interface with coaxial cable, telephone lines, wireless devices, PHY layer hardware, a keypad/display control device or any other suitable media or devices; peripheral devices 1006, which may include counter timers, real-time timers, power-on reset generators or any other suitable peripheral devices; processor 1008, which may control process flow, and which may generate, receive, grant or deny requests such as requests for data flows and requests for network resource allocation; and memory 1010. Components 1002, 1004, 1006, 1008 and 1010 may be coupled together by a system bus or other interconnections 1012 and may be present on one or more circuit boards such as 1020. In some embodiments, the components may be integrated into a single chip.

For the sake of clarity, the foregoing description, including specific examples of parameters or parameter values, is sometimes specific to certain protocols such as those identified with the name MoCA™ and/or Ethernet protocols. However, this is not intended to be limiting and the invention may be suitably generalized to other protocols and/or other packet protocols. The use of terms that may be specific to a particular protocol such as that identified by the name MoCA™ or Ethernet to describe a particular feature or embodiment is not intended to limit the scope of that feature or embodiment to that protocol specifically; instead the terms are used generally and are each intended to include parallel and similar terms defined under other protocols.

It will be appreciated that software components of the present invention including programs and data may, if desired, be implemented in ROM (read only memory) form, including CD-ROMs, EPROMs and EEPROMs, or may be stored in any other suitable computer-readable medium such as but not limited to discs of various kinds, cards of various kinds and RAMs. Components described herein as software may, alternatively, be implemented wholly or partly in hardware, if desired, using conventional techniques.

Thus, systems and methods for compensating for managing transmission of data over a shared media communication network and for facilitating Ethernet audiovisual bridging have been provided. Persons skilled in the art will appreciate that the present invention can be practiced using embodiments of the invention other than those described, which are presented for purposes of illustration rather than of limitation. The present invention is limited only by the claims which follow.

What is claimed is:

1. A method comprising:
   receiving from a first node a persistent reservation request for allocation of network resources for transmission, by the first node via a first networking specification, of data frames not yet received by the first node from a second node via a second networking specification that differs from the first networking specification, wherein the persistent reservation request is for transmission of a first data frame in a first media access plan ("MAP") cycle and for transmission of a second data frame in a second MAP cycle, each of said first data frame and said second data frame that has not yet been received by the first node, each of the first data frame and the second data frame being addressed via the second networking specification to a third node, the persistent reservation request having been generated responsive to a reservation message received by the first node from the second node via the second networking specification, characteristics of the persistent reservation request and the first and second data frames for transmission being indicated by the first networking specification, characteristics of the data frames not yet received by the first node indicated by the second networking specification, and the first node being in communication with a first network that corresponds to the first networking specification and a second network that corresponds to the second networking specification; and establishing a latency-reducing data flow comprising the first data frame and the second data frame, said establishing being based, as least in part, on the persistent reservation request, wherein the latency-reducing data flow is initiated prior to both the first data frame and the second data frame being received by the first node.

2. The method of claim 1 wherein the persistent reservation request comprises a traffic specification.

3. The method of claim 2 further comprising canceling the latency-reducing data flow based on information included in the traffic specification.

4. The method of claim 1 further comprising canceling the latency-reducing data flow based on execution of a link maintenance operation process.

5. The method of claim 1, wherein the establishing comprises allocating network resources during a portion of at least one medium access plan cycle, the portion having a duration that is less than a duration of the medium access plan cycle.

6. The method of claim 1, wherein the first networking specification comprises a non-Ethernet networking specification and the second networking specification comprises an Ethernet networking specification.

7. A device comprising:
a receiver circuit in communication with a first network, the receiver circuit configured to receive a first reservation request from a first node in communication with the first network, wherein the first reservation request is for allocation of network resources for transmission, by a transmitter circuit of the first node via a first communication protocol of the first network, of at least a first and a second data frame not yet received by the first node from a second node via a second communication protocol of a second network, each of the first data frame and the second data frame being addressed via the second communication protocol to a third node, the first reservation request having been generated responsive to a reservation message received by the first node, characteristics of the first reservation request being indicated by the first communication protocol and characteristics of the first and second data frames not yet received being indicated by the second communication protocol;

a processor circuit in communication with the receiver circuit, the processor circuit configured to establish a latency-reducing data flow based on the first reservation request; and the transmitter circuit configured to inform the first node of a grant of the first reservation request, the grant authorizing the first node to transmit the first data frame in a first media access plan ("MAP") cycle and the second data frame in a second MAP cycle, wherein the transmitter circuit is configured to inform the first node of the grant of the first reservation request prior to the first node receiving the second data frame.

8. A method comprising:
receiving, at a first node over a first network that corresponds to a first networking specification, a registration request, the registration request requesting receipt of multicast information by a second node from a third node, the registration request including a traffic specification;

transmitting, using the first node, the registration request to the third node over a second network that corresponds to a second networking specification that differs from the first networking specification;

receiving, at the first node and responsive to the registration request, a first reservation request from the third node over the second network;

generating, using the first node and in response to receiving the first reservation request, a second reservation request for transmission over the first network, the second reservation request differing from the first reservation request; and transmitting, using the first node, the second reservation request to a network coordinator of the first network, the second reservation request conforming to the traffic specification, wherein:
the first node transmits at least two frames of multicast data over the first network, each transmission occurring in a discrete media access plan ("MAP") cycle prior to transmitting a third reservation request to the network coordinator of the first network.

9. The method of claim 8 further comprising, when the network coordinator generates medium access plan cycles and the second reservation request corresponds to one of the media access plan cycles, transmitting at least one additional reservation request, each of the at least one additional reservation request being transmitted in a respective subsequent media access plan cycle.

10. The method of claim 8, further comprising:
receiving, by the first node, a grant from the network coordinator in response to the second reservation request, the grant not being provided to the third node.

11. A method comprising:
transmitting a reservation request to a network coordinator for allocation of network resources on a non-packet-switched network segment during at least two medium access plan cycles for data that has not been received;

receiving, subsequent to transmitting the reservation request, the data from a first packet-switched network segment using a packet-switched network ingress port, wherein the data is addressed to a node of a second packet-switched network segment via a communication protocol associated with the second packet-switched network segment; and transmitting the data over the non-packet-switched network segment to the second packet-switched network segment using a non-packet-switched network egress port.

12. The method of claim 11 further comprising, using the non-packet-switched network egress port, transmitting to the network coordinator a data flow request for data flow from the packet-switched network ingress port to the non-packet-switched network egress port.

13. The method of claim 11 further comprising:
transmitting to the network coordinator the reservation request for the allocation of network resources for transmitting the data to the non-packet-switched network egress port; and
transmitting at least two frames of the data before transmitting a second reservation request to the network coordinator.

14. The method of claim 11, further comprising, when the network coordinator generates medium access plan cycles:
transmitting to the network coordinator the reservation request for the allocation of network resources for transmitting the data to the non-packet-switched network egress port, the reservation request corresponding to one of the generated medium access plan cycles; and
transmitting at least one additional reservation request, each of the at least one additional reservation requests being transmitted in a respective subsequent medium access plan cycle.

15. The method of claim 14 wherein communication over the non-packet-switched network segment is performed in accordance with protocols defined by a specification relating to transmission of data over a shared coaxial medium.

16. The method of claim 11, further comprising receiving a first reservation request from the first packet-switched network segment, wherein transmitting the reservation request is in response to receiving the first reservation request.

17. The method of claim 11, wherein the data is received with characteristics of a first communication protocol associated with the first packet-switched network segment and the data is transmitted with characteristics of a second communication protocol associated with the non-packet-switched network segment.

18. A method comprising:
transmitting, by a first node over a non-Ethernet network, a reservation request for requesting allocation of network resources for transmission, over the non-Ethernet network, of data frames not yet received by the first node over an Ethernet network, wherein the reservation request is for transmission of a first data frame in a first media access plan ("MAP") cycle of the non-Ethernet network and for transmission of a second data frame in a second MAP cycle of the non-Ethernet network, each of said first data frame and said second data frame that has not yet been received by the first node from a second node over the Ethernet network at a time of the transmitting the reservation request, each of the first data frame and the second data frame being addressed via an Ethernet specification to a third node, the reservation request being transmitted in response to a reservation message received by the first node over the Ethernet network, the first node being in communication with the Ethernet network and the non-Ethernet network; and
in response to the reservation request, receiving from a network controller instructions to transmit the first data frame in the first MAP cycle of the non-Ethernet network and the second data frame in the second MAP cycle of the non-Ethernet network.

19. The method of claim 18 wherein the reservation request comprises a traffic specification.

20. The method of claim 18 further comprising:
transmitting the first data frame in the first MAP cycle and the second data frame in the second MAP cycle without transmitting a subsequent reservation request.

21. The method of claim 20, wherein the first data frame comprises a multicast data frame.

22. The method of claim 18, wherein the allocation of network resources is for a portion of at least one medium access plan cycle, the portion having a duration that is less than a duration of the medium access plan cycle.

23. A bridge device comprising:
a processor circuit configured to establish a latency-reducing data flow on a first network based on a reservation request, the latency-reducing data flow comprising a first data frame and a second data frame received from a first node over a second network that differs from the first network in at least message passing characteristics;
a transmitter circuit in communication with the first network, the second network, and the processor circuit, the transmitter circuit configured to transmit the reservation request in response to a reservation message received by the bridge device over the second network and prior to receipt of the first data frame and the second data frame by the bridge device over the second network, each of the first data frame and the second data frame being addressed to a second node via a network specification associated with the second network; and
a receiver circuit configured to receive a grant of the reservation request from a network controller of the first network, the grant authorizing the bridge device to transmit the first data frame in a first media access plan ("MAP") cycle of the first network and the second data frame in a second MAP cycle of the first network.

24. The bridge device of claim 23, wherein:
the receiver circuit is further configured to receive the reservation message from the first node over the second network; and
the transmitter circuit is configured to transmit the reservation request over the first network.

25. A device comprising:
at least one processor circuit configured to:
receive, over a first network, a registration request, the registration request requesting receipt of multicast information by a first node from a second node, the registration request including a traffic specification;
transmit, over a second network that differs from the first network, the registration request to the second node;
receive, over the second network, a first reservation request from the second node responsive to the registration request; and
generate, responsive to the first reservation request received over the first network, a second reservation request for transmission over the second network;
transmit the second reservation request to a network coordinator of the first network, the second reservation request conforming to the traffic specification; and
transmit at least two frames of multicast data over one or more discrete media access plan (MAP) cycles of the first network prior to a transmission of a third reservation request to the network coordinator of the first network.

26. The device of claim 25, wherein the at least one processor circuit is configured to transmit the at least two frames over multiple discrete MAP cycles prior to the transmission of the third reservation request.

27. The device of claim 25, wherein the at least one processor circuit is configured to transmit the at least two frames in one discrete MAP cycle.

* * * * *